US012664787B2

(12) United States Patent
Wong

(10) Patent No.: US 12,664,787 B2
(45) Date of Patent: Jun. 23, 2026

(54) SYSTEM AND METHODS FOR INTEGRATED ONLINE ENVIRONMENTAL IMPACT ASSESSMENT, MONITORING AND VISUALIZATION

(71) Applicant: Kin Man Wong, Hong Kong (HK)

(72) Inventor: Kin Man Wong, Hong Kong (HK)

( * ) Notice: Subject to any disclaimer, the term of this patent is extended or adjusted under 35 U.S.C. 154(b) by 30 days.

(21) Appl. No.: 19/026,781

(22) Filed: Jan. 17, 2025

(65) Prior Publication Data

US 2025/0292581 A1 Sep. 18, 2025

Related U.S. Application Data

(60) Provisional application No. 63/565,519, filed on Mar. 14, 2024.

(51) Int. Cl.
*G06V 20/52* (2022.01)
*G06T 19/20* (2011.01)
*G06V 20/10* (2022.01)

(52) U.S. Cl.
CPC .............. *G06V 20/52* (2022.01); *G06T 19/20* (2013.01); *G06V 20/176* (2022.01); *G06T 2219/2004* (2013.01)

(58) Field of Classification Search
CPC ...... G06V 20/52; G06V 20/176; G06T 19/20; G06T 2219/2004; G06T 17/05;
(Continued)

(56) References Cited

U.S. PATENT DOCUMENTS 7,227,893 B1 * 6/2007 Srinivasa ......... G08B 13/19602
348/169
8,384,542 B1 * 2/2013 Merrill ................... G08B 25/01
340/541
(Continued)

OTHER PUBLICATIONS

International Search Report of PCT Patent Application No. PCT/CN2025/075361 issued on Apr. 29, 2025.
(Continued)

*Primary Examiner* — Tung T Vo

(57) ABSTRACT

A method and a system for online integrated environmental monitoring, assessment, and impact visualization of projects are disclosed. The method includes receiving project site data representing the geographical boundary of a project in a virtual environment and collecting real-world environmental data from fixed and mobile monitoring devices. Model data, modeling parameters, and digital ground data associated with the project are retrieved and unified through a unified connector interface to form a unified input data. The unified input data is processed through one or more impact modeling entities to assess environmental impacts, including air quality, noise, water quality, and ecological effects. Visualizations of the environmental impact determined are transmitted to an environmental assessment planner interface for display. The method and the system provide for real-time integration, efficient impact modeling, and multi-dimensional visualization, enabling stakeholders to evaluate and monitor environmental effects with enhanced precision and accessibility in a seamless digital environment.

19 Claims, 8 Drawing Sheets

(58) Field of Classification Search
CPC ............. G06F 2111/08; G06F 2111/10; G06F 2111/18; G06F 16/29; G06F 30/12; G06F 30/27; G06F 30/13; G06N 20/00; G06Q 10/06; G06Q 50/08; G06Q 50/26
USPC ........................................................ 348/143
See application file for complete search history.

(56) References Cited

U.S. PATENT DOCUMENTS

| | | | | |
|---|---|---|---|---|
| 11,295,131 | B1 * | 4/2022 | Dhawan | G06V 20/52 |
| 12,031,830 | B2 * | 7/2024 | Shao | G16Y 10/35 |
| 2002/0178179 | A1 * | 11/2002 | Rosenblum | G06F 16/40 |
| | | | | 715/209 |
| 2008/0098068 | A1 * | 4/2008 | Ebata | H04L 51/00 |
| | | | | 709/206 |
| 2009/0015460 | A1 * | 1/2009 | Fox | G01S 13/867 |
| | | | | 342/53 |
| 2010/0108580 | A1 * | 5/2010 | Lukasik | G01N 15/0272 |
| | | | | 715/764 |
| 2010/0318512 | A1 * | 12/2010 | Ludwig | G06F 16/29 |
| | | | | 707/722 |
| 2013/0238379 | A1 * | 9/2013 | Prieto | G06Q 50/08 |
| | | | | 705/7.23 |
| 2014/0172513 | A1 * | 6/2014 | MacLean | G06Q 30/018 |
| | | | | 705/7.39 |
| 2014/0279694 | A1 * | 9/2014 | Gauger | G06Q 40/06 |
| | | | | 705/36 R |
| 2015/0110276 | A1 * | 4/2015 | Gereb | H04R 29/008 |
| | | | | 381/56 |
| 2016/0098502 | A1 * | 4/2016 | Havre | G06F 30/18 |
| | | | | 703/9 |
| 2017/0193694 | A1 * | 7/2017 | Freund | G06T 11/001 |
| 2018/0165616 | A1 * | 6/2018 | Sun | G06Q 10/06 |

| | | | | |
|---|---|---|---|---|
| 2019/0138667 | A1 * | 5/2019 | Benesh | G06Q 50/08 |
| 2019/0169982 | A1 * | 6/2019 | Hauge | E21B 47/10 |
| 2019/0283745 | A1 * | 9/2019 | Nagel | G08G 1/0112 |
| 2020/0143598 | A1 * | 5/2020 | Riordan | G06T 19/006 |
| 2020/0258174 | A1 | 8/2020 | Rodriguez | |
| 2020/0311842 | A1 * | 10/2020 | Li | G06Q 50/08 |
| 2021/0064848 | A1 * | 3/2021 | Jagyasi | G06V 20/13 |
| 2021/0148722 | A1 * | 5/2021 | Ko | G01C 21/3841 |
| 2021/0192413 | A1 * | 6/2021 | Shirazipour | G06Q 10/06311 |
| 2021/0307211 | A1 * | 9/2021 | Egger | G06N 3/044 |
| 2021/0375062 | A1 * | 12/2021 | Fleischman | G06F 18/24 |
| 2022/0230389 | A1 * | 7/2022 | Monti | G06Q 30/0278 |
| 2022/0398840 | A1 * | 12/2022 | Dhawan | G08G 5/56 |
| 2023/0013320 | A1 * | 1/2023 | Eller | G06Q 40/06 |
| 2023/0258463 | A1 * | 8/2023 | Nussbaum | G06Q 50/40 |
| | | | | 701/423 |
| 2023/0260052 | A1 * | 8/2023 | Little | G06Q 40/08 |
| | | | | 705/4 |
| 2023/0275897 | A1 * | 8/2023 | Briant | H04L 63/083 |
| | | | | 726/5 |
| 2023/0408477 | A1 * | 12/2023 | Raju | B60H 1/008 |
| 2024/0003245 | A1 * | 1/2024 | Havre | E21B 43/00 |
| 2024/0127385 | A1 * | 4/2024 | Megyese | G06Q 50/265 |
| 2025/0071040 | A1 * | 2/2025 | Wang | G16Y 40/50 |
| 2025/0139738 | A1 * | 5/2025 | Jayaweera | G06T 3/4053 |
| 2025/0238564 | A1 * | 7/2025 | Tehranchi | G06N 20/00 |
| 2025/0272771 | A1 * | 8/2025 | Khuti | G06N 3/042 |

OTHER PUBLICATIONS

Min Yi et al., Application of GIS in Environmental Monitoring Data Management and Analysis, Environmental Science and Management, Dec. 31, 2007, pp. 148-153, vol. 32, No. 12.
European Search Report of European Patent Application No. 25158415.7 issued on Jul. 9, 2025.

* cited by examiner

100

Digital ground data/model 316

900

1

SYSTEM AND METHODS FOR INTEGRATED ONLINE ENVIRONMENTAL IMPACT ASSESSMENT, MONITORING AND VISUALIZATION

CROSS-REFERENCE TO RELATED APPLICATIONS

The subject disclosure claims the benefit of U.S. Provisional Patent Application No. 63/565,519, filed on Mar. 14, 2024, which is incorporated by reference herein in its entirety.

TECHNICAL FIELD

The present disclosure relates to the field of computerized environmental impact assessment (EIA). Particularly, the present disclosure relates to systems, methods, and articles for integrated online environmental monitoring, assessment, and/or multi-dimension and media impact visualization of projects for EIA.

BACKGROUND

With growing concern and awareness, as well as policy and regulatory requirements to uphold well-being of inhabitants, and preserving natural ecology and environment as far as possible, conducting Environmental Impact Assessments (EIAs) is a mandatory process in most countries prior to/during design planning, study, and the subsequent construction of a development project.

Currently, EIA processes rely heavily on manual effort. Significant amounts of work are required to consolidate, and transfer data that has been collected, monitored, processed, calculated, or analyzed across multiple disciplines. These efforts are essential to effectively communicate potential project impacts and their mitigation measures to stakeholders and policymakers.

However, the existing practices remain tedious, labor-intensive, and prone to inefficiencies. The precision and quality of consolidated results can be compromised due to repeated data handling, conversions, or transfers, potentially leading to data loss or reduced reliability. Additionally, findings from the EIA need to be presented to various stakeholders, such as the general-public, project developers, government agencies, and the like. Currently, there exist no automated solutions for collecting, analyzing, and generating reports for EIA assessment of projects, as the data is often from disparate sources or formats, making it difficult to consolidate and/or aggregate the data for holistic/comprehensive impact assessment.

Therefore, there is a need for a solution for automated EIA, that is cost-effective, comprehensive, and reliable.

SUMMARY

An aspect of the present disclosure relates to a method for online integrated environmental monitoring, assessment, and impact visualization of projects. The method (using a processor) includes receiving project site data representing a geographical boundary of a project in a virtual environment, and collecting real-world environmental data from one or more data sources including at least one fixed monitoring device and at least one mobile monitoring device. The real-world environmental data includes parameter values associated with any one or a combination of air quality, noise levels, water quality, or ecological data. The method further includes retrieving model data and corresponding modeling parameters associated with the project, with digital ground data associated with the geographical boundary of the project, providing a unified connector interface for accessing unified input data including any one or a combination of the project site data and the real-world environmental data, the model data, the modeling parameters, and the digital ground data, and processing the unified input data through one or more impact modeling entities to determine environmental impact of the project. The method then includes generating one or more visualizations for the environmental impact determined by the one or more impact modeling entities, and transmitting the one or more visualizations to an environmental assessment planner interface for display. The method provides for real-time integration, efficient impact modeling, and multi-dimensional visualization, enabling stakeholders to evaluate and monitor environmental effects with enhanced precision and accessibility in a seamless digital environment.

In some embodiments, the project site data may be provided by at least one stakeholder through the environmental assessment planner interface.

In some embodiments, the unified connector interface may be configured to ingest data from the one or more data sources, transform data for impact assessment using the one or more impact modeling entities, and/or deliver data to the environmental assessment planner interface, in real-time.

In some embodiments, the environmental impact determined by the one or more impact modeling entities may include at least one of air quality impact, noise impact, water quality impact, or ecological impact.

In some embodiments, the one or more impact modeling entities may be any one or a combination of a statistical model, a mathematical model, a machine learning model, and an expert system.

In some embodiments, each of the one or more impact modeling entities may be configured to determine the environmental impact based on the unified data input, and the environmental impact determined by other impact modeling entities.

In some embodiments, the one or more visualizations may be generated for at least one of the environmental impact based on inputs received from the environmental assessment planner interface.

In some embodiments, for generating the one or more visualizations, the method may include positioning, by the processor, a three-dimensional (3D) model of the project on the geographical boundary in the virtual environment, overlaying, by the processor, the digital ground data over the geographical boundary of the project in the virtual environment, and transmitting, by the processor, the virtual environment to the environmental assessment planner interface for display, where the environmental assessment planner interface allows for construction and manipulation of the 3D model.

In some embodiments, the one or more visualizations may be generated in formats conducing for representation in any one or a combination of, a web-browser interface, a mobile phone, a desktop computer interface, or a virtual reality, augmented reality or mixed reality interface, for modeling, assessment, and monitoring of the environmental impact.

In some embodiments, the method may further include freezing, by the processor, the project and storing data associated with the environmental impact and the one or more visualizations of the project in a data storage and/or re-activating, by the processor, the project by retrieving the data stored in the data storage.

In some embodiments, the project site data may include, but not limited thereto, any one or a combination of terrain data, road data, houses data, and ground types data.

In some embodiments, the at least one fixed monitoring device may be any one or a combination of, noise sensors, air sensors, water sensors, temperature sensors, pressure sensors, mounted on any of lamp-posts, roof-tops, and/or immovable structures fixed on ground.

In some embodiments, the at least one mobile monitoring device may be any one or a combination of drones, action cameras, mobile phones, and 360 cameras.

In some embodiments, the project may be any one or a combination of infrastructural projects, industrial projects, mining projects, energy projects, water management projects, and waste management projects.

In some embodiments, the digital ground data has one or more data layers including any one or a combination of roads, geography, topology, land uses, boundaries, hydrology, elevation, and image background.

In some embodiments, the method may further include screening the project for environmental impact assessment requirements based on the project site and required surrounding data.

In some embodiments, the method may further include determining, by the processor, the model data, and the modeling parameters during scoping of the project, and where the model data and the modeling parameters may be indicative of data associated with structures proposed to be built in the project that have potential to affect the environment.

In some embodiments, the method may further include generating, by the processor, one or more measures to mitigate the environmental impact determined by the one or more impact modeling entities.

An aspect of the present disclosure relates to a system for online integrated environmental monitoring, assessment, and impact visualization, including a processor and a memory operatively coupled to the processor, where the memory includes one or more processor executable instructions configured to cause the processor to perform the steps of the method described above.

An aspect of the present disclosure relates to a computer-readable medium storing instructions for online integrated environmental monitoring, assessment, and impact visualization, the instructions performing the steps of the method described above.

Various objects, features, aspects, and advantages of the inventive subject matter will become more apparent from the following detailed description of preferred embodiments, along with the accompanying drawing figures in which like numerals represent like components.

BRIEF DESCRIPTION OF THE DRAWINGS

The accompanying drawings are included to provide a further understanding of the present disclosure, and are incorporated in and constitute a part of this specification. The drawings illustrate example embodiments of the present disclosure and, together with the description, serve to explain the principles of the present disclosure.

DETAILED DESCRIPTION

Figure 1:
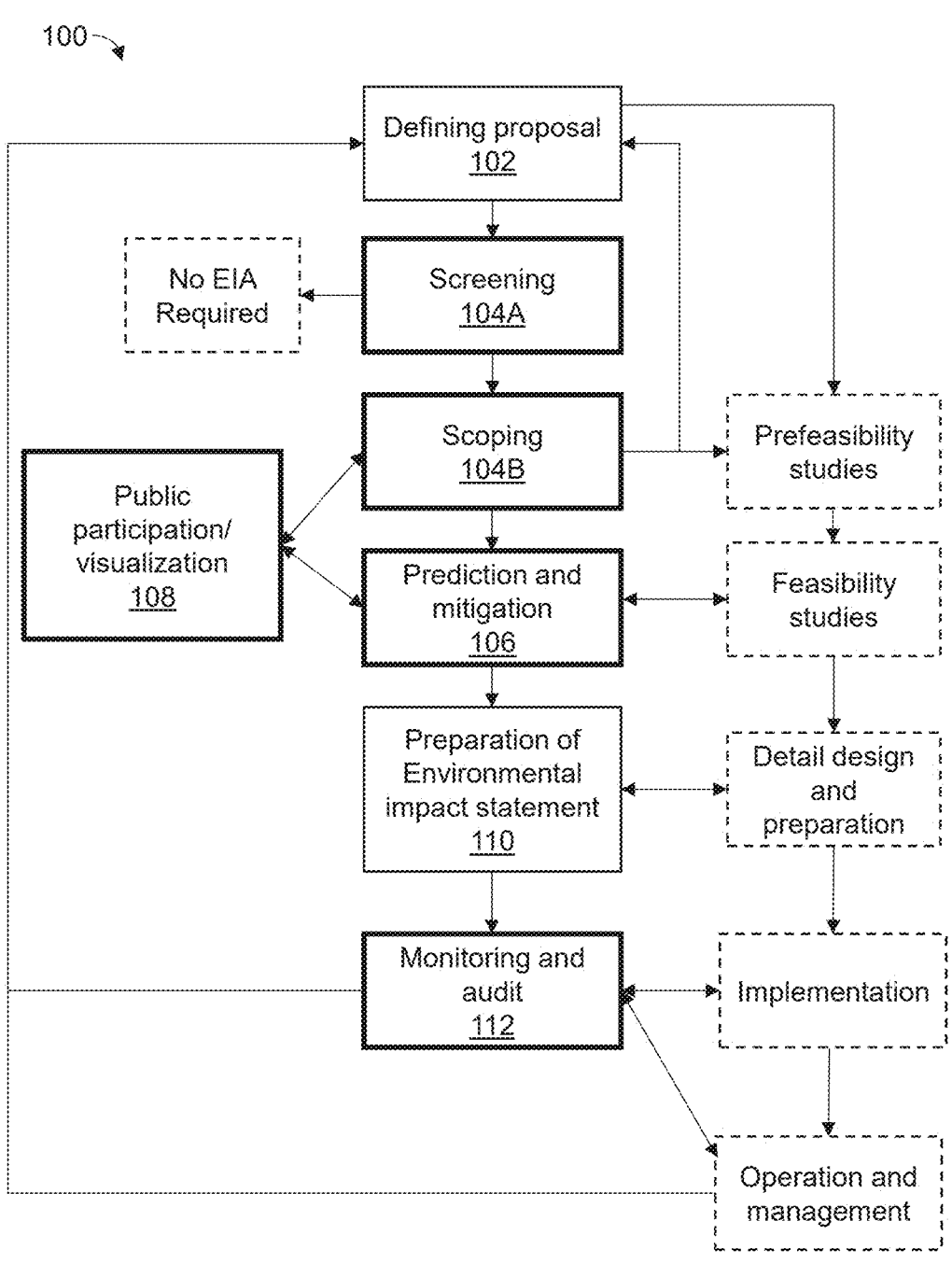
FIG. 1 is a flow diagram or chart illustrating a workflow of an Environmental Impact Assessment (EIA) process.

The particulars shown herein are by way of example and for purposes of illustrative discussion of the various embodiments only and are presented in the cause of providing what is believed to be the most useful and readily understood description of the principles and conceptual aspects of the methods and compositions described herein. In this regard, no attempt is made to show more detail than is necessary for a fundamental understanding, the description making apparent to those skilled in the art how the several forms may be embodied in practice.

Environmental Impact Assessments (EIAs) are mandated in most countries before any project (such as infrastructural, industrial, energy, mining, quarrying, water management, waste management projects, and the like). EIAs involve analyzing multi-faceted or multi-disciplinary data, that is collected from different/disparate data sources. Due to the disparate nature of the data sources, intervention is required by multiple sets of people (such as from project developers, consultants, general-public, approval authorities, and other stakeholders), who may use their intuition to understand and correlate seemingly disparate data to determine the environmental impact of the project.

Most current practices for presenting multi-faceted or multi-disciplinary environmental impacts rely on consolidating outputs generated or exported from disparate computerized applications, software tools, or digital devices. Given the diversity in digital formats, storage locations, mechanisms, transmission protocols, media, and data sizes, manual aggregation, massaging/processing, or formatting is often required. Aggregation through manual intervention may be necessary to provide a holistic or overarching view of all potential environmental impacts induced by a proposed development project, which may affect both existing inhabitants and the natural environment. However, relying on human intervention for such analysis is prone to error, bias, and is costly, leading to loss in genuineness, integrity, and data quality during the analysis.

The present disclosure provides a system/apparatus, and a method for computerized/automated environmental impact monitoring, assessment, and visualization. The present disclosure conducts EIA for a project site corresponding to a project to be planned, constructed, or monitored at a later stage, and determines pre-estimated, pre-assessed, or pre-approved impact or threshold values for conformance during and after construction of the project. For example, a development project may relate to residential housing or infrastructure, such as highways, plants, incinerators, and the like, but not limited thereto, for which the EIA may be performed automatically, and various parameters/benchmarks (such as permissible noise emissions or effluents) may be determined to which the project must comply with to minimize/mitigate adverse environmental impacts identified for the development project. In order to perform computerized EIA, relevant digital data is collected from fixed monitoring devices (e.g. Internet Protocol (IP)-based or Internet-of-Things (IoT) devices, etc.), mobile monitoring devices (e.g. drone, camera, mobile data capture devices, etc.), and/or other existing or available geographical map, data from various government, private or self-acquired sources, and the like. The received data may be unified, processed, and visualized in accordance with an EIA workflow.

FIG. 1 illustrates a workflow 100 for EIA assessment. The workflow 100 includes, at step 102, defining a proposal for a project. As stated, the project may be related to any one or combination of infrastructural projects (such as of roads, buildings, bridges, etc.), industrial projects (such as factories, manufacturing/production plants, etc.), energy projects (such as sub-stations, hydroelectric power plants, wind turbines, nuclear power plants, etc.), mining, quarrying, water management (such as water supply systems, reservoirs, dams, etc.), waste management projects (such as sewage systems, etc.), and the like, but not limited thereto. The proposal may include details of the project, such as location/site of implementing the project, and the like. In some embodiments, the proposal may be defined in computer read-able formats, such as key-value pairs, where the values may be media files such as text, video, audio, images, sensor data, and the like.

At steps 104A and 104B, the proposal may be used to screen and scope the proposed project, respectively. The screening and scoping may be performed during the planning stages of the project to determine geographical extent, existing ecological or conservation values/sensitivity with respect to any surrounding and/or neighborhood ground features or elements, as well as other potential impact to any identified receptor or sensitivity points or locations such as a school, a residential area, a nursery, sites of Special Scientific Interest, etc., for example. The screening step 104A may also determine if the project requires an EIA assessment. Each of aforementioned parameters screened may be defined/represented in quantifiable terms for computerized screening, such as through comparison of various parameters associated with the project with corresponding thresholds. For example, if the geographical area required for the project is less than a predetermined area threshold, the screening step 104A may indicate that the EIA is not required for the project, and vice-versa if the geographical area required for the project is greater than the predetermined area threshold. The screening step 104A may include preparing an initial environmental impact evaluation, which may enable the project to be classified according to environmental sensitivity thereof. If it is determined that EIA is required, the workflow 100 includes scoping the project at step 104B, where issues may be defined (to identify areas of potential environmental impact), revisions may be made to the proposal (based on public participation, scientific experts, and/or regulatory authorities), and terms of reference may be defined for full EIA. To scope the project, pre-feasibility studies may be conducted.

At step 106, the workflow 100 includes predicting and mitigating environmental impact of the project. The current and predicted impact of the project may be evaluated via regulatory guidelines, or acceptable and/or approved standards or methodologies in conjunction with computerized mathematical modeling processes. Then, measures to mitigate assessed/evaluated impact in order to meet regulatory, acceptable, and/or approval requirements may be determined. To predict and mitigate the environmental impact, feasibility studies may be performed.

Thereafter, at step 108, the outcome/assessments of steps 104B and 106 may be made available for public participation, to collect stakeholder comments and consent to the proposed development. The outcomes/assessments may be visualized, and published for access by the stakeholders, such as to the project developers, the general public (which may include scientists, community members, local inhabitants, activists, etc.), regulatory authorities, and the like. Following the public participation step/stage 108, an environmental impact statement may be prepared, reviewed (by regulatory authorities, among other entities), and finalized. The finalization of the environmental impact statement may be facilitated by detail and design preparation of the project. Thereafter, the project may be implemented, i.e., constructed, and operated/managed.

Then, at step 112, the workflow 100 includes monitoring and auditing the project. The monitoring step 112 includes the undertaking of monitoring using currently digital devices and/or other on-site field inspection approach in order to check and to audit for conformance to the stipulated mitigated measures as approved. In some embodiments, the monitoring step 112 may be performed to ensure compliance with thresholds and/or benchmarks for a plurality of parameters defined in the environmental impact statement.

The present disclosure seeks to automate/computerize at least steps 104A, 104B, 106, and/or 112 of the workflow 100.

Figure 2:
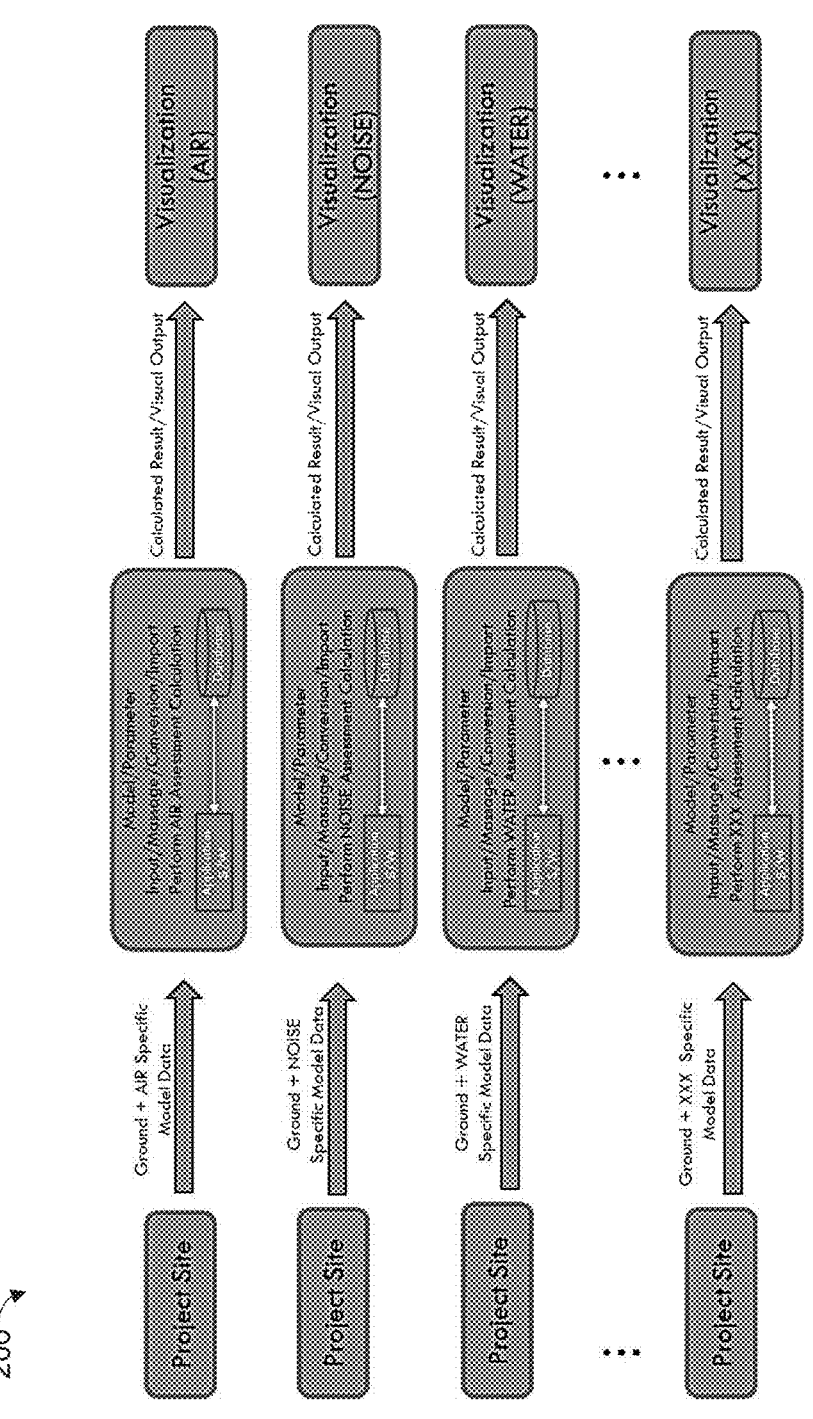
FIG. 2 is a schematic diagram illustrating existing practices or approaches to perform computerized impact prediction.

FIG. 2 illustrates current/existing practices or common approaches 200 to conduct computerized prediction and assessment. Being repeatable, computerized prediction is considered best practices or acceptable approach within the industry to both assess the current and, more importantly, predict or forecast future impact of a proposed development project.

Currently, impact prediction and assessment involve multiple disciplines/environmental parameters, such as air, noise, water, ecology, etc. Notwithstanding this, each impact assessment has to be performed individually and/or independently, which produce or generate output in different media, or format. In such cases, the outputs of the impact assessments in different formats have to be consolidated into a report or other presentation material at a later stage. For example, parameter-specific models associated with each of air, noise, water, ecology, and the like, have to be used separately (each of which may be in different data formats) to generate outputs indicative of the environmental impact. Further, outputs of the processing by the parameter-specific models may be consolidated and visualized individually. In current solutions, multiple different models are required to individually process each of the parameter-specific model data due to the differences in the data formats. Notwithstanding this, in current solutions, digital ground data/model of the project site may be extracted at different times (during which the digital data/model may have been updated), thereby leading to situations where each model may not be able to provide an assessment of environmental impact upon common denominator data, which may cause inaccuracies in the impact assessments especially considering many of the parameters are interrelated. For example, air humidity and water temperatures are interrelated, and making impact assessments for air humidity without factoring in the rise in temperature of a nearby water-body where effluents are released may not provide accurate results. Additionally, existing systems do not have mechanisms to coordinate between multiple models for providing a holistic EIA. Human intervention is often required to perform such holistic, multi-facetted analysis. However, as stated, human interventions are costly, error prone, and also prone to bias.

The present disclosure addresses at least the aforementioned drawbacks by providing systems/apparatuses, and methods for integrated online environmental monitoring, assessment, and/or impact visualization of projects. Various embodiments of the present disclosure, including key processes, stages, or steps of the system and/or the method, are described in reference to FIGS. 3 to 9.

Figure 3:
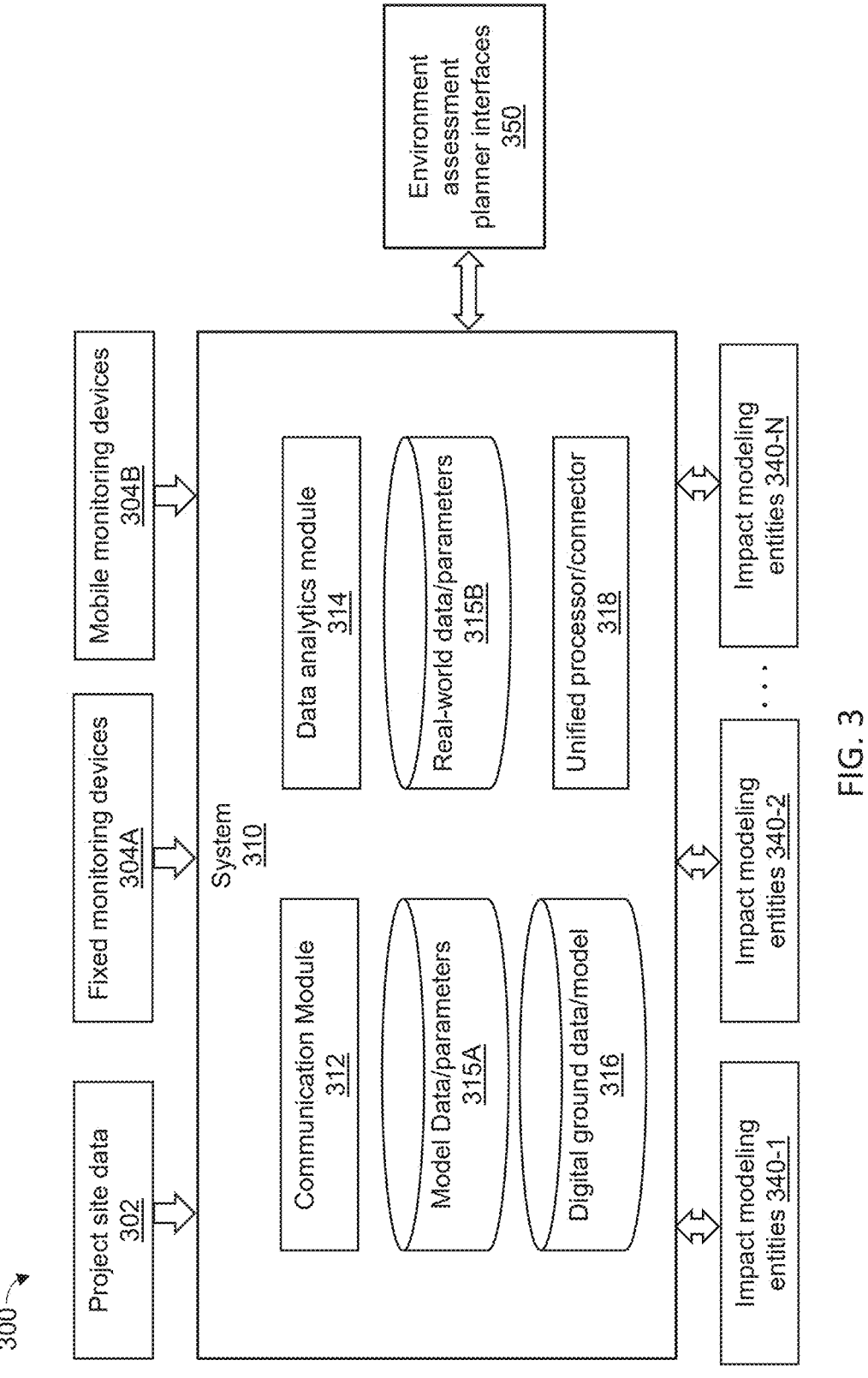
FIG. 3 is a schematic diagram of an architecture having a system for an online integrated environmental monitoring, assessment, and impact visualization, in accordance with an embodiment of the present disclosure.

Online Integrated Environmental Monitoring, Assessment and Impact Visualization System Referring to FIG. 3, a system 310 for online integrated environmental monitoring, assessment, and impact visualization is shown. In some embodiments, the system 310 may be communicatively coupled with one or more data sources (such as project data source having project site data, fixed monitoring devices 304A, and mobile monitoring devices 304B), and one or more environment assessment planner interfaces 350 (which may be implemented/executed in computing devices used by the stakeholders, such as general public, regulatory authorities, project developers, and the like). The system 310 may be configured to receive one or more real-world data or environmental parameters associated with a project from the data sources, and process/analyze the data for EIA. In some embodiments, the system 310 may also be configured to communicate with one or more impact modeling entities (such as impact modeling entities 340-1 to 340-N) for processing of the environmental parameters. Further, results of the processing of the environmental parameters/real-world data (i.e., form the EIA) may be visualized and provided to the environment assessment planner interfaces 350.

In some embodiments, the system 310 may be implemented within an electronic device/computing device. The computing device may be any one or a combination of servers, virtual machines, cloud computing devices, desktop computers, laptops, smartphones, and the like, but not limited thereto. The system 310 may include a processor (not shown), and a memory (not shown) operably coupled to the processor. The processor may be implemented as one or more microprocessors, microcomputers, microcontrollers, digital signal processors, central processing units, logic circuitries, and/or any devices that manipulate data based on operational instructions. Among other capabilities, the processor may be configured to fetch and execute computer-readable instructions stored in a memory. The memory may store the computer-readable or processor executable instructions or routines, which may be fetched and executed to create or share the data units to other elements of the system 310. The processor-executable instructions may be associated with online integrated environmental assessment, monitoring, and visualization for projects. The memory may include any non-transitory storage device including, for example, volatile memory such as Random Access Memory (RAM), or non-volatile memory such as an Erasable Programmable Read-Only Memory (EPROM), flash memory, and the like.

In an embodiment, the system 310 may also include an interface(s) (not shown). The interface(s) may include a variety of interfaces, for example, interfaces for data input and output (I/O) devices, referred to as I/O devices, storage devices, and the like. The interface(s) may facilitate communication between the system 310 and a database, and the monitoring devices 304A and 304B, using peripherals allowing wireless and/or wired communication using a communication means/network. The interface(s) may also provide a communication pathway for one or more components within the system 310.

In an embodiment, one or more processing modules(s) may be included in the system 310. The processing modules may be implemented as a combination of hardware and software (for example, programmable instructions) to implement one or more functionalities of the system 310. In examples described herein, such combinations of hardware and software may be implemented in several different ways. For example, the software for the processing modules(s) may be processor-executable instructions stored on a non-transitory machine-readable storage medium and the hardware for the processing modules(s) may include a processing resource (for example, one or more processors), to execute such instructions. In other embodiments, the processing module(s) may be implemented by electronic circuitry. In some embodiments, the processor module(s) may include a communication module 312, a data analytics module 314, a unified processor/connector interface/module 318, and the like, but not limited thereto. The operations/functionalities of the processing modules are described below, in the context of computerized/automated EIA.

For computerized EIA, a project representing the corresponding real-world development site may be created. In some embodiments, the project may be represented using a predetermined data structure. In some embodiments, various parameters associated with the project may be represented as key-value pairs (such as using JavaScript Object Notation or extensible Markup Language, for example). In some embodiments, a digital twin of the project or project site (i.e., with respect to the geographical boundaries of the project) may be created using a computer or any software tool. Representations of the project/project site in a virtual environment may allow the project to be evolved or updated throughout the life cycle of its development from initial planning, detail design, construction, and up until its handing over to operation. Data associated with the project/project site is represented as project site data 302. In other embodiments, the project may be defined in any media format, which may include any one or a combination of text, images, audio, video, sensor data, and the like.

In some embodiments, the creation of the project/project site (in the virtual environment) may include setting-up of a plurality of parameters such as geographical boundary as well as the sourcing, collection, and acquisition associated with the project. Then, compilation of different concerned data layers representing real-world ground features (such as terrain, road, houses, ground types, and the like, but not limited thereto) associated with the geographical boundary, among other parameters, may be included in the project site data 302 to facilitate subsequent assessment and/or visualization thereof. In some embodiments, the project site data 302 may be static data associated with the project that are predetermined by developers of the project. In such embodiments, the geographical boundaries and the corresponding real-world ground data may be defined in the project proposal in computer-readable formats. In some embodiments, the project/project site data 302 may be provided by the developers of the project during creation of digital twins of the project/project site. The project site data 302 may be stored within a database associated with the system 310, or may be stored externally to the system 310. When the project site data 302 is stored externally, the data therein may be retrieved using Application Programming Interfaces (APIs), among other communication protocols.

Further, the system 310 may be configured to receive other related real-world data associated with the project/project site. In some embodiments, the real-world data may be collected in-field via one or more fixed monitoring devices 304A (e.g. noise sensors, air sensors, water sensors, temperature sensors, pressure sensors, etc.) or mobile monitoring devices 304B (e.g. drone, camera, lidar, etc.). In some embodiments, the fixed monitoring devices 304A may be passive devices configured to capture or collect localized or site-specific data at a fixed location for environmental parameters, such as atmospheric temperature, wind, environmental noise level, and the like, but not limited thereto. In some embodiments, the fixed monitoring devices 304A may be IP-based, such as IoT devices. In some embodiments, the mobile monitoring devices 304B may be active devices configured to capture or collect localized or site-specific environment at any location within and around geographical boundaries of the project site. In some embodiments, the mobile monitoring device 304B may be configured to capture geographical characteristics, such as change in landscape, location of various ground objects as well as actual ground and/or site situation, and the like, but not limited thereto.

As stated, the project site data 302, and each type of the real-world data collected by the fixed and mobile monitoring devices 304A and 304B, may have disparate/incompatible formats. The system 310 may be configured to unify/connect the disparate data for EIA.

Unified Input

Pivotal to online and integrated treatment of received data (such as the project site data 302 and the real-world data) is a unification mechanism/means allowing related, but disparate or independent data capture, to be collected, ingested, and channeled to the same place or portal. This enables different data to be massaged, orchestrated, and organized in an overarching manner so as to facilitate their subsequent processing or treatment.

Figure 4:
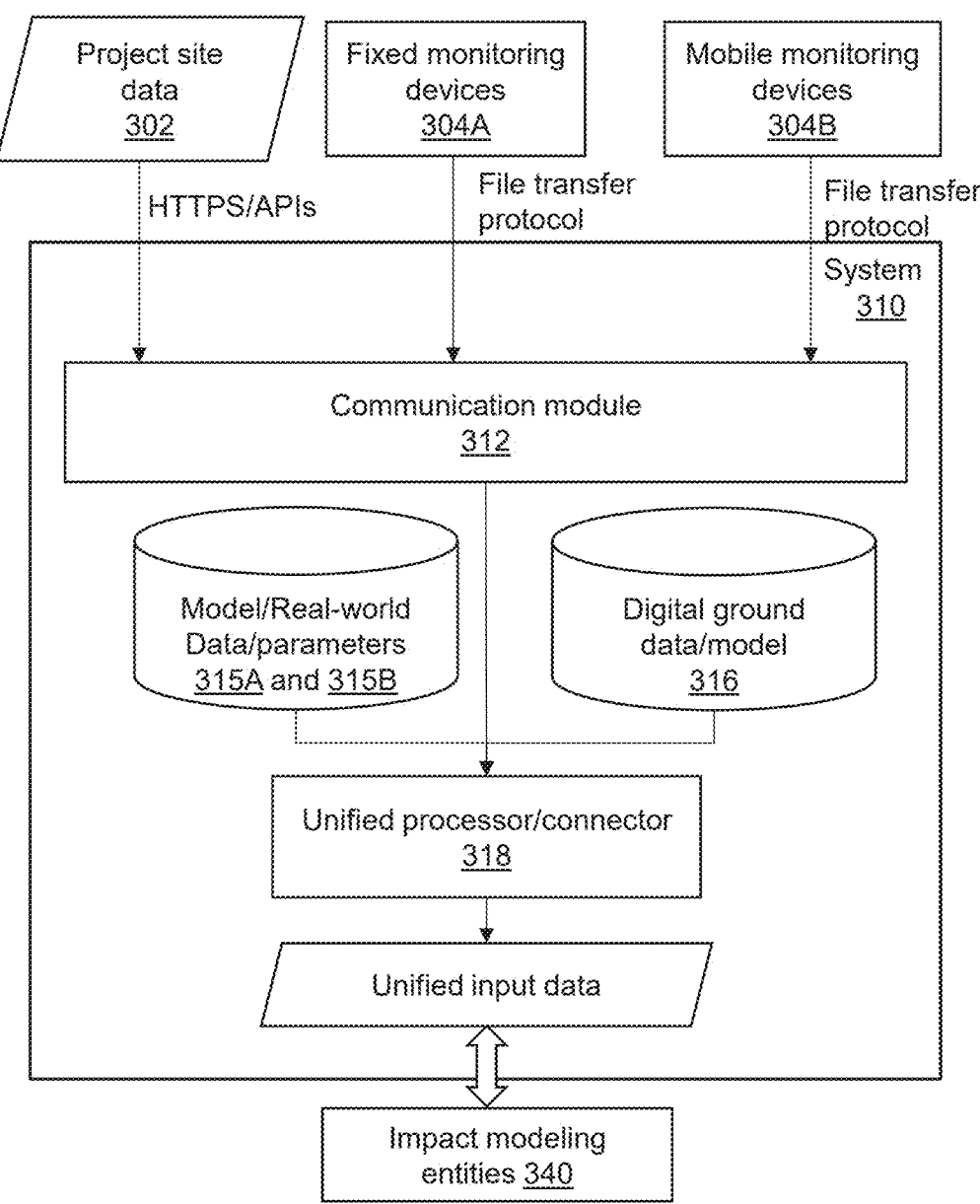
FIG. 4 is a schematic diagram illustrating a workflow of the system for online integrated environmental monitoring, assessment, and impact visualization, in accordance with an embodiment of the present disclosure.

FIG. 4 illustrates the key method to gather real-time or ad-hoc data from the database storing the project site data 302, and the passive fixed monitoring devices 304A and the active mobile monitoring devices 304B. As stated, the fixed monitoring devices 304A may be devices including fixed IP-based or IoT monitoring devices such as environmental monitoring devices mounted on mounted on any of lamp-posts, roof-tops, and/or immovable structures (such as walls, buildings, furniture, fixtures, and the like) fixed on ground, for example. On the other hand, the mobile monitoring devices 304B may include mobile digital data capture devices such as drones, action cameras, mobile/smart phone, 360 cameras, and the like, but not limited thereto, for example. In some embodiments, the system 310 may include the communication module 312 that enables the system 310 to communicate with external devices. In terms of wired or wireless transmission or communication, the communication module 312 may use any one or a combination of including, but not limited to, General Packet Radio Service (GPRS) wireless data network, wireless fidelity (Wi-Fi)

network, telecommunication, satellite communication networks, near field communication, electric wires, optical fiber cables, and the like, for data transmission with the external devices (such as data sources, the environmental assessment planner interface 350, and/or the impact modeling entities 340). The communication module 312 may use the same or different data transmission protocols for data exchange with each of the data sources. The data may be communicated and handled via Transmission Control Protocol/Internet Protocol (TCP/IP)-based network protocols for further handling using industrial standard or common Hypertext Transfer Protocol (HTTPS), Application Programming Interface (APIs), and/or File Transfer Protocol (FTP) function, but not limited thereto, for secure data transfer over a computer network.

In some embodiments, the communication module 312 may be configured to facilitate the orchestration of the real-world data received from the fixed and mobile monitoring devices 304A, 304B. The communication module 312 may be configured to orchestrate the reception of data from different sources such that the data are synced, combined, organized, cleaned, and unified/integrated for performing analytics/visualization and/or processing for EIA, among other operations. The communication module 312 may integrate the received data into a 'unified input data.'

Unified User Interface and 3D Visualization

In some embodiments, the data analytics module 314 may be configured to provide a unified user interface (through the environmental assessment planner interface 350) for analyzing the unified input data. In some embodiments, the data analytics module 314 may be implemented as an Oden cloud platform configured to receive and make available the unified input data for analytics. The data analytics module 314 may provide a unified user interactive and three-dimensional (3D) visualization environment provides for an online and browser-based intuitive operation and display. Besides desktop computers, browser-based interface may provide versatile accessibility by other mobile devices including smart phones. In some embodiments, the interactive user interface may be made available on the computing device in which the system 310 is implemented. In such embodiments, the computing device (such as those associated with the environmental assessment planner interface 350) may include a graphical user interface (GUI), API, or a command line interface (CLI), among others, for visualization and/or presentation of the unified input data, and/or the impact assessments made therewith. In other embodiments, the system 310 may be configured to transmit analytics data obtained from analyzing the unified input data to external computing devices, such as those operated by other stakeholders.

Further, to facilitate a streamlined and coherent user operation and result display, a unified or under-one-roof capabilities, including modeling, assessment, surveillance, and 3D visualization, may be performed, or supported in the online integrated environmental monitoring, assessment, and impact visualization system 310.

Multi-Discipline Assessment Model Data and Modeling Parameters

In some embodiments, model data 315A and respective modeling parameters may be stored within the system 310. The model data 315A may be essential and influential to the environmental impact prediction. In some embodiments, the model data 315A, and real-world data 315B and respective parameters, may relate to mathematical or digital representation and actual real-world measurements of physical atmospheric environment and emission values, which include the ground or specific feature associated to a development project or site. For example, model/real-world data/parameters relate to simulated, calculated, predicted, or assumed air dispersion, noise attenuation, water flow, and the like etc. as opposed to actual collected field measurements respectively. On the other hand, the digital ground data/model 316 may relate to a proposed man-made structure, such as a building, a road, a bridge, natural and existing terrain and landscape. Further, in some embodiments, modeling parameters may relate to the physical characteristics of object(s) or source(s) that may cause or emit potential pollution of various kinds, particularly air, noise or water pollution, or other impact on the environment (such as ecological impact). As examples, the modeling parameters may include source types, number and speed of vehicle, friction of road, atmospheric conditions, operation period, pattern or frequency or types of emission, and the like, but not limited thereto.

Referring back to FIG. 3, utilizing/using a standardized data organization and database structure, both model data 315A and modeling parameters may be pre-prepared and imported for further modification to suit a particular project or location. In some embodiments, the model data 315A and the modeling parameters may be stored in an on-premises storage (such as a database) within the system 310. In other embodiments, the model data 315A may be housed in a virtual computing environment with online wired or wireless accessibility maintained via in-house computer system or cloud infrastructure. Similarly, the real-world data/environmental parameters 315B and modeling parameters thereof (which may be associated with the real-world data collected by the fixed and mobile monitoring devices 304A and 304B) may also be stored in on-premise storage of the system 310, or in an external virtual computing environment. The real-world data 315B may be stored in the same or a different database as the model data 315A.

City and/or National Level Digital Ground Data

In some embodiments, the system 310 may also include a digital ground/model 316, which may include data corresponding to terrain, and landscape, as well as other natural features associated with a city, a geographical region, or a national-level area. The digital ground data/model 316 may form base information to represent or simulate the real-world site, but in a digital form. For example, the digital ground data/model 316 may correspond to a digital twin of the geographical area associated with the project. The digital ground data/model 316 are required for both prediction calculation as well as realistic 3D visualization. Though the digital ground data/model 316 is considered as base data or model data, given its potentially large data size and geographical coverage, the digital ground data/model 316 needs to be treated or handled in different way within the system 310.

Whilst city or national level digital ground data/model 316 may be stored or managed centrally or virtually with online accessibility maintained, the digital ground data/model 316 may be retrieved in tile/grid-based approach or techniques with optional caching mechanism in order to be disseminated effectively and responsively.

Figure 5:
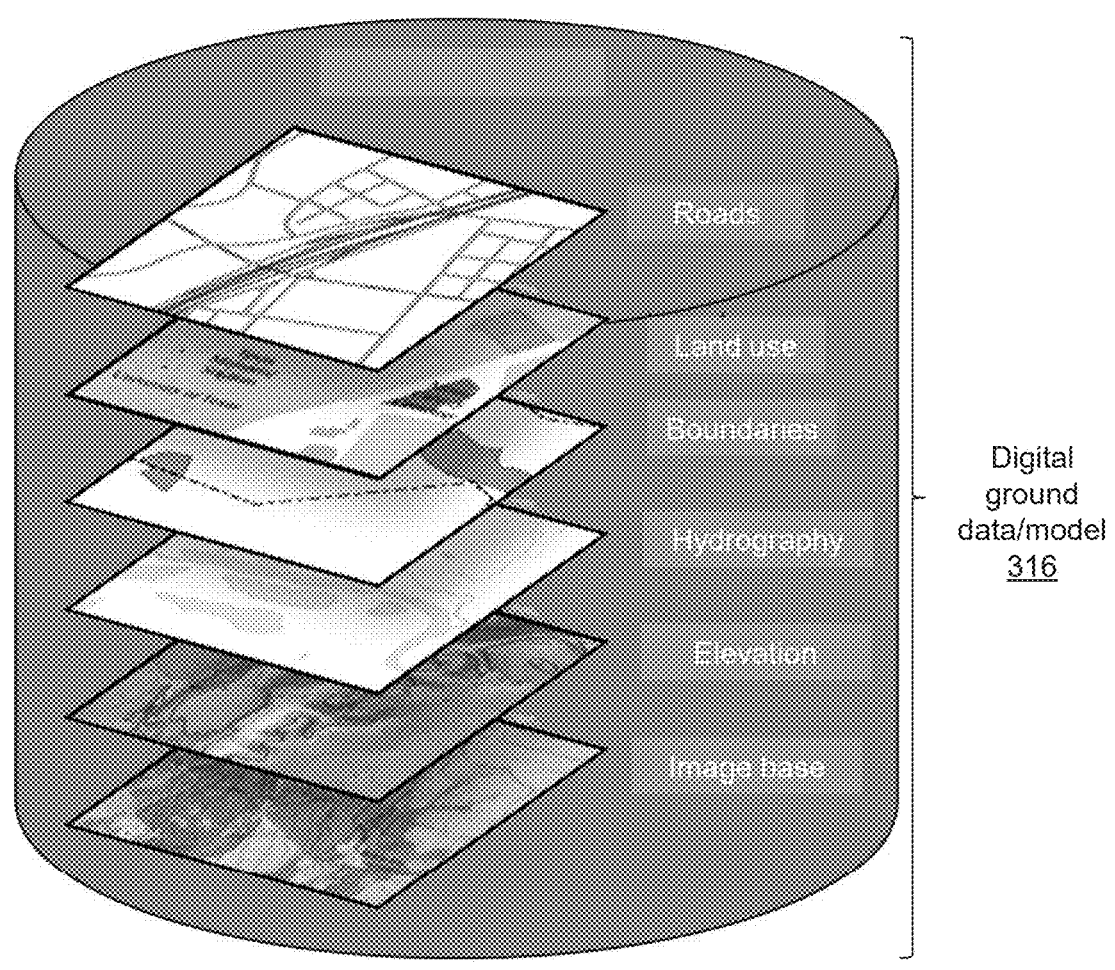
FIG. 5 is a representation of digital ground data utilized by the system for an online integrated environmental monitoring, assessment, and impact visualization, in accordance with an embodiment of the present disclosure.

FIG. 5 illustrates the use of the digital ground data 316 to represent a real-world site where the proposed development project is located. In some embodiments, the digital ground data 316 may include key or major ground features which are modelled or digitally represented as data layers, such as roads, land use, boundaries, hydrology, elevation and image background, and the like, but not limited thereto. The data layers may be stored in a corresponding database, in Geographical Information System (GIS) or spatial format.

Unified Processor and Connector Interface

Whilst model data of a real-world site remain the same, differences in input formats required by different modeling software/modules/engines (which are a set of processor executable instructions) and tools necessitate a unified mechanism to enable holistic/comprehensive processing thereof for impact assessment. Further, to enable concurrent access of data by different impact modeling entities/modules/engines, processing as well as utilization of server-based computing environment, a unified processing, queuing mechanism as well as tracking of calculation progress is required. Depending on the complexity and geographical extent of a project, prediction calculation may be time-consuming. Also, tracking and managing extent of completion, success or failure, and load sharing and balancing. The system 310 may include the unified processor/connector 318 for coordinated/orchestrated data ingestion (from the data sources), processing (through the impact modeling entities 340), and data delivery (to the environmental assessment planner interface 350 for visualization), while also tracking progress and ensuring requested data is retrieved and made available to all the entities in the architecture shown in FIG. 3.

Figure 6:
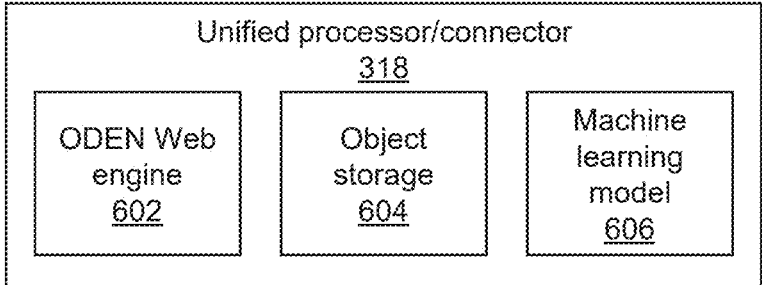
FIG. 6 is a schematic diagram of a unified processor/connector interface of the system, in accordance with an embodiment of the present disclosure.
Figure 7:
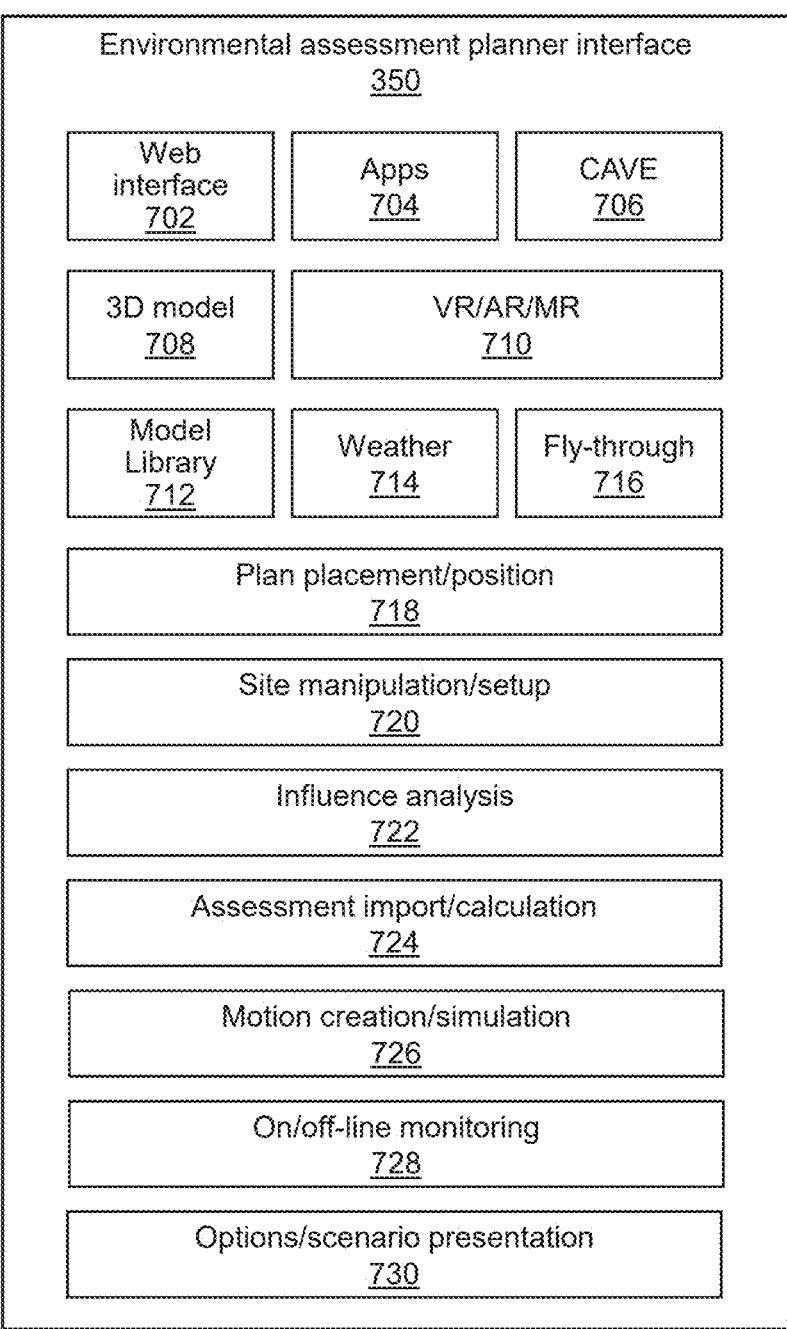
FIG. 7 is a schematic diagram of an environmental assessment planner interface that facilitates environmental monitoring, assessment, and impact visualization, in accordance with an embodiment of the present disclosure.

FIG. 6 illustrates key components of a unified processor/connector 318 of the system 310. In some embodiments, the unified processor 318 may include a web engine 602 (such as an Oden web engine), an object storage 604 for storing objects (or instances of different data structures), and a machine learning (ML) model 606, which may be used to prepare environmental parameters, basemap, and other relevant data. In some embodiments, the ML model 606 may be any one or a combination of linear regression models, logistic regression models, decision trees, random forest models, neural networks, transformers, large language models, large multimodal models, computer vision models, and the like. The data may be prepared and made accessible by the unified processor/connector interface 318 to multi-disciplinary impact modeling entities (such as entities 340) or tools in order to perform impact assessment. In some embodiments, the impact modeling entities 340 may be configured to determine environmental impact of the project, such as noise impact, air quality impact, object detection such as for species identification in ecological monitoring, trend analysis, anomaly detection, and the like, but not limited thereto.

In some embodiments, the unified processor/connector interface 318 may include an interface (such as an API, or any other interface or program) that facilitates orchestration of data collection, processing, visualization via pre-defined data, database structure, open format, protocol, etc. In some embodiments, the unified processor 318 may use object-based storage for efficient management and retrieval of data. Further, for effective filtering and selection of meaningful collected real-world data/parameters for further processing, the unified processor/connector interface 318 may utilize or extract data generated or processed from machine learning model associated either with the unified processor or monitoring devices. The unified processor 318 may allow all relevant data for EIA to be available/accessible from a single endpoint. Furthermore, the unified connector 318 may ensure the latest data is available for processing and visualizations. Accordingly, the unified processor 318 may be configured to retrieve data, exchange the data with multiple entities, determine progress/status of processing (such as at the impact modeling entities 340), and attend to data requests from other entities, in real-time. The protocols for communication between different entities through the unified processor 318 may be suitably adapted for real-time orchestration.

Impact Modeling Entities

In some embodiments, the impact modeling entities 340 may be in-house/internally developed processing modules/engines. In other embodiments, the impact modeling entities 340 may be third-party modeling software, module, engines, or tools. In some embodiments, the impact modeling entities 340 may be standard/common modeling entities known in the art. The impact modeling entities 340 may be configured to execute a set of processor-executable instructions that determine the environmental impact of the project, at least for one of the environmental parameters (such as air, noise, water, ecology, and the like). In some embodiments, the impact modeling entities 340 may be configured to determine at least one environmental impact using any one or a combination of statistical/mathematical models, machine learning models, expert systems, and the like, but not limited thereto. The impact modeling entities 340 may be pre-trained/trained/finetuned/adapted to determine the environmental impact based on the unified input data provided thereto (which may include the project site data 302, the real-world environmental data, the model data, the modeling parameters, and the digital ground data). The impact modeling entities 340 may be in communication with the unified processor/connector interface 318, through the wired communication means. The key parameters/data that may be communicated to each impact modeling entity 340 for impact assessment may include project and model data 315A, real-world data 315B, modeling parameters, and calculations or assessment result output or generated from other modeling entities 340. The unified processor/connector interface 318 may then receive the impact assessment for the corresponding environmental variables from the impact modeling entities 340.

Environmental Assessment Planner Application Approach

As stated, environmental assessment and visualization of the impact of projects are multi-faceted in nature, i.e., involving a number of processes, aspects, and disciplines. Thus, aggregating the impact of the project to provide an overarching or holistic view may be labor-intensive, long-winded, and tedious. As a solution, the system 310 is equipped with multiple capabilities under one-roof. The system 310 may utilize a single and cradle-to-grave application or approach to enhance coherence, smoothness of operation and, more importantly, as far as possible perseverance to genuineness of assessment impact.

Figure 8:
FIG. 8 illustrates a flowchart of an example method for an online integrated environmental monitoring, assessment, and impact visualization, in accordance with an embodiment of the present disclosure.
Figure 8:
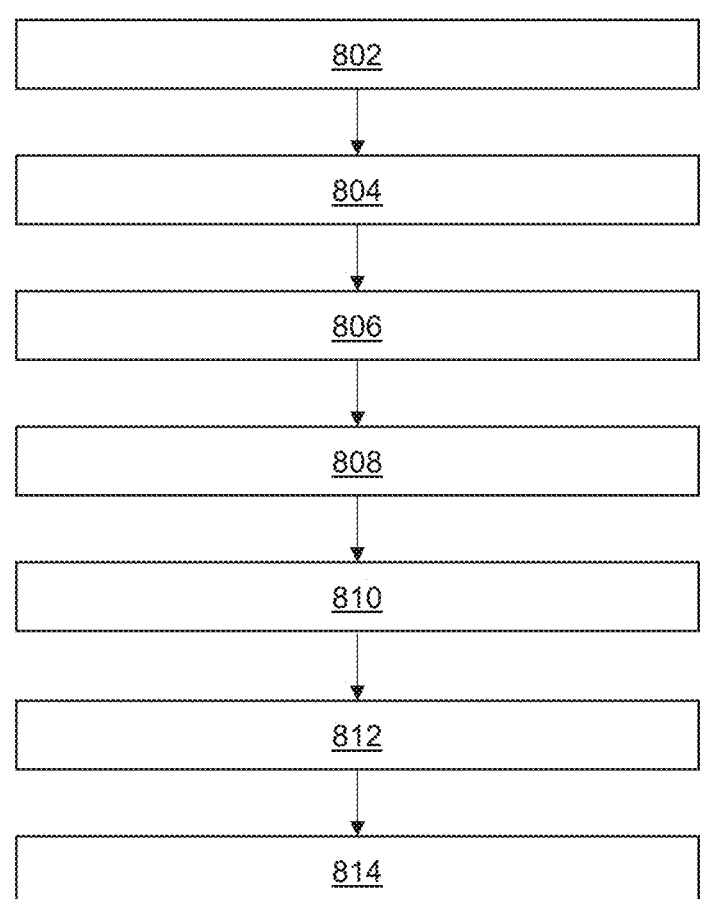

In this regard, FIGS. 3 and 8 illustrate an environmental assessment planner interface 350, as a physical system to offer integrated online environmental monitoring, assessment, and/or multi-dimensional and media impact visualization. The environmental assessment planner interface 350 may allow different stakeholders, including the project developers, consultants, public, regulatory authorities, and the like, to plan, design, assess, and determine the environmental impact of the project. The environmental assessment planner interface 350 may include an interface (such as a GUI, API, CLI, or the like) that facilitates presentation of visualizations or the impact assessments from the impact modeling entities 340. The environmental assessment planner interface 350 may be implemented in a computing device, which may be any one of smartphones/mobile phones, desktop computers, tablets, servers, and the like, but not limited thereto.

Through interfacing/integration with the system 310 established in FIG. 3, the environmental assessment planner interface 350 may be configured to utilize the city and national-level digital ground data 316 as pre-built realistic digital ground coupled with pre-built spatial or environmental data layers therein to support readily available user operation, without the need for preceding processes required to collect, import, or massage the base dataset. The system 310 may be configured to pre-process/prepare the model data 315A and the real-world data 315B, combine them with the digital ground data 316, to form the unified input data, which may be made available to the environmental assessment planner interface 350.

To facilitate intuitive and quick setup of the project site in the virtual environment typically required during initial planning, the environmental assessment planner interface 350 may be used to provide import capabilities for scanned or extracted image from plan, drawing, sketch, or geo-referenced image available in web, report, or other sources, and the like, from the system 310, given the system 310 makes available all data associated with the project. The imported image, for example, may be placed/positioned 718 in its actual geographical location in a more precise manner in the virtual environment (thereby creating a digital twin, for example) via a geo-referencing process or function.

Once positioned geographically, a realistic illustration of the project may be set up via upload of available 3D models 708, which may be in any common format including, but not limited to, Building Information Modeling (BIM), Sketchup (SKP), or Rhino (3DM) as well as spatial data in formats such as GeoJSON and SHAPE (SHP) formats. Additionally, Site Manipulation/Setup tools for 3D model 708 construction and manipulation (such as rotate, scale, move, change of base elevation or height, etc.) as well as a pre-built model library 712, including pre-collected, pre-massaged model components, may facilitate setting-up of the project 720 economically during early project stage with limited budget and resources.

Further, to screen and/or scope the project (i.e. steps 104A and 104B of FIG. 1), pre-built or imported spatial and/or environmental data layers may be used to perform an influence analysis 722 (which may be facilitated by the impact modeling entities 340 that are adapted to identify vulnerable entities in the environment). The influence analysis 722 may identify affected environmental elements or factors (e.g. population, dwelling, parks, habitats, species, flora and fauna, sensitivity sites, river and water courses, and the like) and other concerned or sensitive layers needing consideration, awareness, or attention during an environmental assessment process. The environmental elements/factors (which may be quantified and/or categorized as the environmental parameters) help compare and contrast different site location options or scenarios to reach for an optimal one to proceed to detail study.

For step 106 of prediction and mitigation of the environmental impact in FIG. 1, the environmental assessment planner interface 350 may communicate with the system 310 for online calculation or processing capabilities. In some embodiments, the key consideration factors/environmental parameters of air, noise, water, or other environmental impact may be imported 724 by the environmental assessment planner interface 350 from the system 310. In some embodiments, aside from the online assessment of the system 310, pre-calculated or offline assessment of environmental impact (such as reports made on local computing devices, papers, images, and the like) may also be uploaded to the environmental assessment planner interface 350 by users thereof to provide quick or instant review of various calculated impact in one single application.

Furthermore, to analyze impact of other environmental parameters that may be applicable to a particular project or site aside from those for which data is available at the system 310, the system 310 or the environmental assessment planner interface 350 may be configured to perform motion creation or simulation 726. Hence, simulated movement (e.g. weather 714, air ventilation, seasonal wind, vehicle, or traffic flow etc.), flow, atmospheric effect, phenomenon, or climate etc. can be added via imported or uploaded using a pre-defined digital format.

Being able to review or overlay interactively and intuitively all the concerned environmental impact under one-roof or a single application (i.e., the environmental assessment planner interface 350) and, more importantly, upon the same digital ground or background is crucial to provide quick, effective, and efficient informed decision making to stakeholders and policy makers, among others.

For the step 108 of public participation/visualization in FIG. 1, the environmental assessment planner interface 350 may be configured to access the visualizations created by the data analytics module 314 accessed via multiple methods or devices, including web interfaces 702 (such as browsers), software applications 704, Virtual Reality/Augmented Reality/Mixed Reality (VR/AR/MR) devices 710 as well as in immersive environment such as Cave Automatic Virtual Environment (CAVE) 706. Further, the proposed project or site may also be reviewed in the form of a workbench, where different scenarios or options for prediction and mitigation may be compared side-by-side. The environmental assessment planner interface 350 may allow the stakeholders hover with fly-through 716 via defining all the required way points (or camera) points, as well as view points for pre-defined locations of interest to facilitate direct navigation to a specific geographical location for review, and be able to set up a project website via shared website link for convenient access by the different stakeholders. These capabilities of the system 310 preserve the genuineness of assessment impact by effectively dispense with the need, efforts, turnaround time and budget which may be required to engage a third-party novice company or production organization to undertake second or third handling in order to prepare for a project website or other visual material for engagement meeting or presentation.

Further, for step 112 of monitoring and audit in FIG. 1, the environmental assessment planner interface 350 may interface or integrate with on-line IP-based devices or third-party web-site (via the unified input data generated by the system 310, for example,) allowing efficient and economical retrieval and display of monitored data, which may include photos, videos, sounds, alerts, processed AI-based results, and the like. The monitoring may be on/off-line 728, either using on-the-fly monitoring or using APIs from a repository of other third-party application via the unified processor/connector interface 318.

Further, during streamlined cradle-to-grave execution of the workflow 100 of FIG. 1 by the system 310 and the environmental assessment planner interface 350, the unified input data, the analytics, and the visualizations created may be tracked, whereby different options/scenarios/studies 730 at each stage (viz. planning, detail design, assessment and monitoring) may be created and stored as well as shared handily via a website link to other stakeholders or parties for review, comment, or modification should it be needed. The environmental assessment planner interface 350 may allow effective management (e.g. create, copy, delete, search etc.)

and administration (e.g. define access privilege, download, archive etc.) of specific data or information pertaining to a particular scenario, option of a proposed project in different development stage. More importantly, this provides strong flexibility for a project to be tracked in both discrete or sequential stage to better cater for the dynamic environment of the project as a result of rapidly changing social and economic consideration or political direction.

In some embodiments, the development (or planning thereof) of the project may be frozen or put on hold at a particular stage (e.g. planning), and then be re-activated after a period of time. When the project is frozen, the impact assessments and the visualizations made therefor may be stored in a storage indicative of an online web-based system or a database. To re-reactivate the project, the project may be copied or re-created with archived data stored or kept tracked in the online web-based system or its underlying databases to quicken the setup, yet preserving previous work or knowledge by other preceding personnel or subject matter experts.

Another aspect of the present disclosure relates to a method 800 for online integrated environmental monitoring, assessment, and impact visualization. The method 800 may be implemented by the system 310 (or a processor associate with the system 310). The method 800 may provide a computerized/automated means to execute the workflow 100 of FIG. 1, to perform the EIA for a project.

At step 802, the method 800 includes receiving, by the processor, project site data (such as project site data 302) that represents a geographical boundary of a project within a virtual environment. The project may be an infrastructural project (such as roads, bridges, buildings, etc.), industrial projects (such as factories, power plants, and the like), energy projects, mining projects, and the like, but not limited thereto. The project site data may be provided by developers, consultants of the project, through an environmental assessment planner interface (such as the environmental assessment planner interface 350 of FIGS. 3 and 7). In some embodiments, the geographical boundary may be represented in the virtual environment, which may form the base for developing a digital twin of the project (or the structures proposed under the project). In some embodiments, the project site data may be provided by at least one stakeholder through the environmental assessment planner interface 350.

In some embodiments, the method 800 may include screening (for example as per step 104A of the workflow 100), by the processor, the project for EIA requirements based on the project site data. When the project site data indicate that EIA assessments are required for the project (such as when the geographical area required by the project is greater than a predetermined threshold), the method 800 may proceed to steps 804 to 814. Otherwise, the method 800 may be terminated. Further, in some embodiments, the method 800 may include determining, by the processor, the model data, and the corresponding modeling parameters during scoping (such as according to step 104B of the workflow 100) of the project. In some embodiments, the model data and the modeling parameters may include data/characteristics/properties associated with the structures proposed to be built for the project, and the parameters thereof which may have the potential to affect the environment. After determining the model data and the modeling parameters, the method 800 may proceed to steps 804 to 814.

At step 804, the method 800 includes collecting, by the processor, real-world environmental data from one or more data sources, which include at least one fixed monitoring device and at least one mobile monitoring device (such as monitoring devices 304A and 304B, respectively). In some embodiments, the real-world environmental data may include parameter values associated with air quality, noise levels, water quality, and/or ecological data, but not limited thereto. The real-world environmental data may be retrieved through the data transmission protocols used by the monitoring devices. In some embodiments, the fixed monitoring devices may be any one or a combination of, noise sensors, air sensors, water sensors, temperature sensors, pressure sensors, mounted on any of lamp-posts, roof-tops, and/or immovable structures (such as walls, pillars, fixtures, etc.) fixed on ground. In some embodiments, the mobile monitoring device may be any one or a combination of, drones, action cameras, mobile phones, and 360 cameras, but not limited thereto.

At step 806, the method 800 includes retrieving, by the processor, model data (such as model data 315A of FIG. 4) and corresponding modeling parameters associated with the project, and digital ground data (such as digital ground data 316 of FIG. 3) associated with the geographical boundary of the project. Further, the digital ground data may include one or more data layers corresponding to any one or a combination of, roads (such as land data), geography, topology, land uses, boundaries, hydrology, elevation, image background, and the like, but not limited thereto.

At step 808, the method 800 may include providing, by the processor, a unified connector interface (such as the unified connector interface 318) for accessing unified input data. The unified input data may include any combination of the project site data, the real-world environmental data, the model data, the modeling parameters, and the digital ground data. In some embodiments, the unified connector interface may be configured to ingest data from the one or more data sources, transform data for impact assessment using the one or more impact modeling entities, and/or deliver data to the environmental assessment planner interface, in real-time. The unified connector interface may provide a single endpoint with a common data exchange protocol with different entities providing or requesting data in different/disparate formats, thereby addressing problems/challenges associated with existing solutions, and reducing complexity of a computerized/automated EIA system. The environmental impact determined by the impact modeling entities may allow for impact prediction and mitigation according to step 106 of the workflow 100.

In some embodiments, the method 800 may include generating, by the processor, one or more measures to mitigate the environmental impact determined by the or more impact modeling entities. In some embodiments, the measures may be predetermined, and retrieved from a database. In other embodiments, the measures may be generated by an artificial intelligence (AI) model. Different measures may be determined/retrieved for each of the different environmental impact predicted/determined by the impact modeling entities. The measures may be listed/presented along with the visualizations in the environmental assessment planner interface. In some embodiments, during the management/operation stage of the project, the measures may be determined, and automatically implemented by autonomous agents, based on the monitoring of the environmental parameters tracked by the system 310.

At step 810, the method may include processing, by the processor, the unified input data through one or more impact modeling entities (such as impact modeling entities 340 of FIGS. 3 and 4) to determine the environmental impact of the project. In some embodiments, each of the impact modeling entities is configured to determine the environmental impact based on the unified data input, as well as the environmental impact determined by other impact modeling entities. In some embodiments, the impact modeling entities may be any one or a combination of, a statistical model, a mathematical model, a machine learning model, and an expert system. The impact modeling entities may be internally constructed, or may be third-party entities (such as those hosted on a separate computing device/server). In some embodiments, the impact modeling entities may be standardized modeling entities commonly used or accepted for EIA. In some embodiments, the environmental impact determined by the impact modeling entities includes at least one of, air quality impact, noise impact, water quality impact, and/or ecological impact.

At step 812, the method 800 may include generating, by the processor, one or more visualizations representing the environmental impact as determined by the impact modeling entities. In some embodiments, the visualizations may be generated for at least one of the environmental impact based on inputs received from the environmental assessment planner interface. For example, the stakeholder using the environmental assessment planner interface may request for visualization on air quality impact. In such examples, the system 310 may be configured to provide visualizations associated with air quality impact, and not others, unless found to be relevant by the impact modeling entities. In some embodiments, the visualizations may be generated in formats conducing for representation in any one or a combination of, a web-browser interface, a mobile phone, a desktop computer interface, or a virtual reality, augmented reality, or mixed reality interface, for modeling, assessment, and monitoring of the environmental impact.

In some embodiments, for generating the one or more visualizations, the method 800 may include positioning, by the processor, a 3D model (such as 3D model 708 of FIG. 7) of the project on the geographical boundary in the virtual environment, overlaying, by the processor, the digital ground data over the geographical boundary of the project in the virtual environment; and transmitting, by the processor, the virtual environment to the environmental assessment planner interface for display, where the environmental assessment planner interface allows for construction and manipulation of the 3D model (such as rotate, scale, move, change of base elevation or height, etc.)

At step 814, the method 800 may include transmitting, by the processor, the visualizations to the environmental assessment planner interface for display. The environmental assessment planner interface may be used by different stakeholders, such as the project developers, the general-public, regulatory authorities, and the like, for assessing, monitoring, and visualizing environmental impact of the project.

In some embodiments, the environmental impact determined by the impact modeling entities and the visualizations of the environmental impact may be used to generate reports listing benchmarks and/or thresholds of operation of the project, to minimize/mitigate the environmental impact caused by the construction and operation of the project. The benchmarks and/or thresholds may be associated with operational parameters (such as the amount of effluents that are allowed to be released in a day, etc.) In some embodiments, the steps 808 to 814 may be iterated for monitoring and auditing of conformance of the project with the benchmarks and/or thresholds. In some embodiments, alerts may be generated and transmitted to the stakeholders to detection of non-conformance with the thresholds.

In some embodiments, the method 800 may further include freezing, by the processor, the project and storing data associated with the environmental impact and the one or more visualizations of the project in a data storage (such as a database within the system 310), and/or re-activating, by the processor, the project by retrieving the data stored in the data storage.

Figure 9:
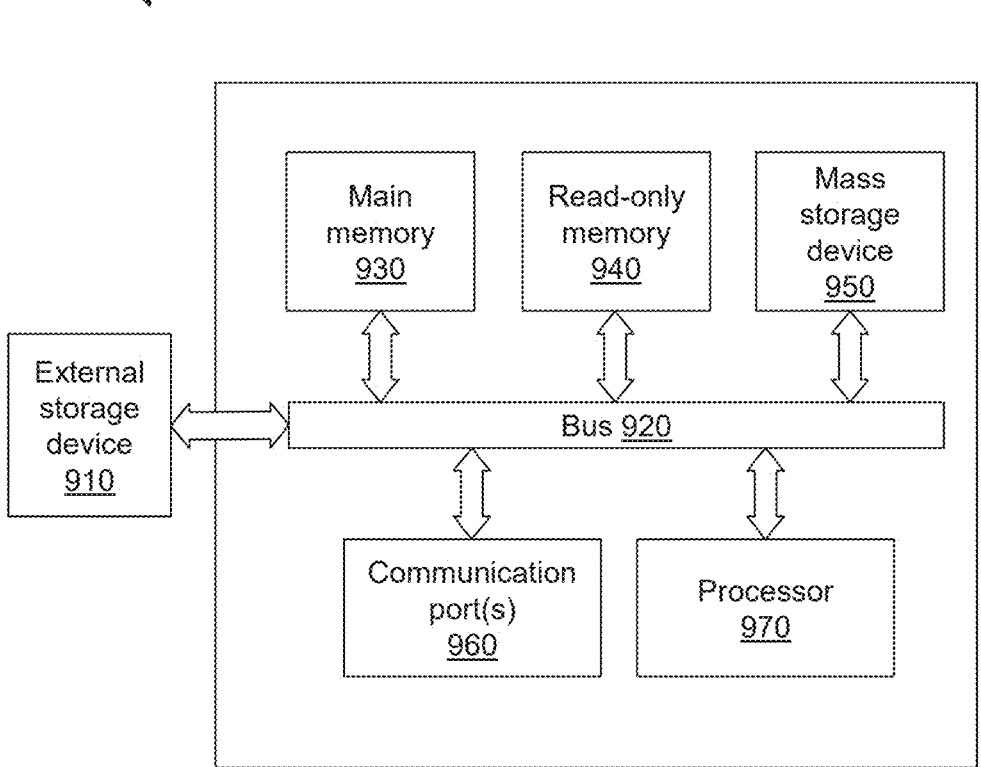
FIG. 9 illustrates an example computer system in which or with which the embodiments of the system may be implemented, according to embodiments of the present disclosure.

The system 310 and the method 800 may be implemented on a computer system. Referring to FIG. 9, the block diagram represents a computer system 900 that includes an external storage device 910, a bus 920, a main memory 930, a read only memory 940, a mass storage device 950, a communication port 960, and a processor 970. A person skilled in the art will appreciate that the computer system 900 may include more than one processor 970 and communication ports 960. The processor 970 may include various modules associated with embodiments of the present disclosure. The communication port 960 can be any of a Recommended Standard 232 port for use with a modem-based dialup connection, a 10/100 Ethernet port, a Gigabit or 10 Gigabit port using copper or fiber, a serial port, a parallel port, or other existing or future ports. The communication port 960 may be chosen depending on a network, such as a Local Area Network (LAN), a Wide Area Network (WAN), or any network to which computer system 900 connects.

In an embodiment, the memory 930 can be a RAM, or any other dynamic storage device commonly known in the art. The Read-Only Memory (ROM) 940 may be any static storage device(s) e.g., but not limited to, a Programmable Read-Only Memory (PROM) chip for storing static information. The mass storage 950 may be any current or future mass storage solution, which may be used to store information and/or instructions. Exemplary mass storage solutions may include, but are not limited to, Parallel Advanced Technology Attachment (PATA) or Serial Advanced Technology Attachment (SATA) hard disk drives or solid-state drives (internal or external, e.g., having Universal Serial Bus (USB) and/or Firewire interfaces), one or more optical discs, Redundant Array of Independent Disks (RAID) storage, e.g., an array of disks (e.g., SATA arrays).

In an embodiment, the bus 920 communicatively couples the processor(s) 970 with the other memory, storage, and communication blocks. The bus 920 may be, e.g., a Peripheral Component Interconnect (PCI)/PCI Extended (PCI-X) bus, Small Computer System Interface (SCSI), USB, or the like, for connecting expansion cards, drives, and other subsystems as well as other buses, such as a front side bus (FSB), which connects the processor 970 to the computer system 900.

In another embodiment, operator, and administrative interfaces, e.g., a display, keyboard, and a cursor control device, may also be coupled to the bus 920 to support direct operator interaction with computer system 900. Other operator and administrative interfaces may be provided through network connections connected through communication port 960. In some embodiments, the external storage device 910 can be any kind of external hard-drives, floppy drives, Compact Disc-Read Only Memory (CD-ROM), Compact Disc-Re-Writable (CD-RW), Digital Video Disk-Read Only Memory (DVD-ROM). Components described above are meant only to exemplify various possibilities. In no way should the aforementioned exemplary computer system 900 limit the scope of the present disclosure.

While the foregoing describes various embodiments of the present disclosure, other and further embodiments of the present disclosure may be devised without departing from the basic scope thereof. The scope of the present disclosure is determined by the claims that follow. The present disclosure is not limited to the described embodiments, versions, or examples, which are included to enable a person having ordinary skill in the art to make and use the present disclosure when combined with information and knowledge available to the person having ordinary skill in the art.

The invention claimed is:

1. A method for online integrated environmental monitoring, assessment, and impact visualization of projects, comprising:

receiving, by a processor, project site data representing a geographical boundary of a project in a virtual environment;

collecting, by the processor, real-world environmental data from one or more data sources comprising at least one fixed monitoring device and at least one mobile monitoring device, the real-world environmental data comprising parameter values associated with any one or a combination of: air quality, noise levels, water quality, or ecological data;

retrieving, by the processor, model data and corresponding modeling parameters associated with the project, and digital ground data associated with the geographical boundary of the project;

providing, by the processor, a unified connector interface for providing access to unified input data comprising any one or a combination of: the project site data, the real-world environmental data, the model data, the modeling parameters, and the digital ground data;

processing, by the processor, the unified input data through one or more impact modeling entities to determine environmental impact of the project;

generating, by the processor, one or more visualizations for the environmental impact determined by the one or more impact modeling entities; and transmitting, by the processor, the one or more visualizations to an environmental assessment planner interface for display;

wherein for generating the one or more visualizations, the method comprises:

positioning, by the processor, a three-dimensional (3D) model of the project on the geographical boundary in the virtual environment;

overlaying, by the processor, the digital ground data over the geographical boundary of the project in the virtual environment; and transmitting, by the processor, the virtual environment to the environmental assessment planner interface for display, wherein the environmental assessment planner interface allows for construction and manipulation of the 3D model.

2. The method of claim 1, wherein the project site data is provided by at least one stakeholder through the environmental assessment planner interface.

3. The method of claim 1, wherein the unified connector interface is configured to ingest data from the one or more data sources, transform data for impact assessment using the one or more impact modeling entities, and/or deliver data to the environmental assessment planner interface, in real-time.

4. The method of claim 1, wherein the environmental impact determined by the one or more impact modeling entities comprises at least one of: air quality impact, noise impact, water quality impact, or ecological impact.

5. The method of claim 1, wherein the one or more impact modeling entities are any one or a combination of: a statistical model, a mathematical model, a machine learning model, and an expert system.

6. The method of claim 1, wherein each of the one or more impact modeling entities is configured to determine the environmental impact based on the unified data input, and the environmental impact determined by other impact modeling entities.

7. The method of claim 1, wherein the one or more visualizations are generated for at least one of the environmental impact based on inputs received from the environmental assessment planner interface.

8. The method of claim 1, wherein the one or more visualizations are generated in formats conducing for representation in any one or a combination of: a web-browser interface, a mobile phone, a desktop computer interface, or a virtual reality, augmented reality, or mixed reality interface, for modeling, assessment, and monitoring of the environmental impact.

9. The method of claim 1, further comprising:
freezing, by the processor, the project and storing data associated with the environmental impact and the one or more visualizations of the project in a data storage; and/or
re-activating, by the processor, the project by retrieving the data stored in the data storage.

10. The method of claim 1, wherein the project site data comprises any one or a combination of: terrain data, road data, houses data, and ground types data.

11. The method of claim 1, wherein the at least one fixed monitoring device is any one or a combination of: noise sensors, air sensors, water sensors, temperature sensors, pressure sensors, mounted on any of lamp-posts, roof-tops, and/or immovable structures fixed on ground.

12. The method of claim 1, wherein the at least one mobile monitoring device is any one or a combination of: drones, action cameras, mobile phones, and 360 cameras.

13. The method of claim 1, wherein the project is any one or a combination of: infrastructural projects, industrial projects, mining projects, energy projects, water management projects, and waste management projects.

14. The method of claim 1, wherein the digital ground data has one or more data layers comprising any one or a combination of: roads, geography, topology, land uses, boundaries, hydrology, elevation, and image background.

15. The method of claim 1, further comprising screening the project for environmental impact assessment requirements based on the project site data.

16. The method of claim 1, further comprising determining, by the processor, the model data, and the modeling parameters during scoping of the project, and wherein the model data and the modeling parameters are indicative of data associated with structures proposed to be built in the project that have potential to affect the environment.

17. The method of claim 1, further comprising generating, by the processor, one or more measures to mitigate the environmental impact determined by the one or more impact modeling entities.

18. A system for online integrated environmental monitoring, assessment, and impact visualization, comprising:
a processor; and
a memory operatively coupled to the processor, wherein the memory comprises one or more processor executable instructions configured to cause the processor to:
receive project site data representing a geographical boundary of a project in a virtual environment;

collect real-world environmental data from one or more data sources comprising at least one fixed monitoring device and at least one mobile monitoring device, the real-world environmental data comprising parameter values associated with any one or a combination of: air quality, noise levels, water quality, or ecological impact;
retrieve model data and corresponding modeling parameters associated with the project, with digital ground data associated with the geographical boundary of the project;
provide a unified connector interface for accessing unified input data comprising any one or a combination of: the project site data and the real-world environmental data, the model data, the modeling parameters, and the digital ground data;
process the unified input data through one or more impact modeling entities to determine environmental impact of the project;
generate one or more visualizations for the environmental impact determined by the one or more impact modeling entities; and
transmit the one or more visualizations to an environmental assessment planner interface for display;
wherein for the generated one or more visualizations, the processor to:
position a three-dimensional (3D) model of the project on the geographical boundary in the virtual environment;
overlay the digital ground data over the geographical boundary of the project in the virtual environment; and
transmit the virtual environment to the environmental assessment planner interface for display, wherein the environmental assessment planner interface allows for construction and manipulation of the 3D model.

19. A non-transitory computer-readable medium storing instructions for online integrated environmental monitoring, assessment, and impact visualization, the instructions, when executed by a processor, configure the processor to perform functions, including functions to:
receive project site data representing a geographical boundary of a project in a virtual environment;
collect real-world environmental data from one or more data sources comprising at least one fixed monitoring device and at least one mobile monitoring device, the real-world environmental data comprising parameter values associated with any one or a combination of: air quality, noise levels, water quality, or ecological impact;
retrieve model data and corresponding modeling parameters associated with the project, with digital ground data associated with the geographical boundary of the project;
provide a unified connector interface for accessing unified input data comprising any one or a combination of: the project site data and the real-world environmental data, the model data, the modeling parameters, and the digital ground data;
process the unified input data through one or more impact modeling entities to determine environmental impact of the project;
generate one or more visualizations for the environmental impact determined by the one or more impact modeling entities; and transmit the one or more visualizations to an environmental assessment planner interface for display;

wherein for the generated one or more visualizations, the processor to:

position a three-dimensional (3D) model of the project on the geographical boundary in the virtual environment;

overlay the digital ground data over the geographical boundary of the project in the virtual environment; and transmit the virtual environment to the environmental assessment planner interface for display, wherein the environmental assessment planner interface allows for construction and manipulation of the 3D model.

* * * * *